June 5, 1934.  F. RIEBEL, JR., ET AL  1,961,168
INSECTICIDE DELIVERY APPARATUS
Filed Jan. 30, 1933
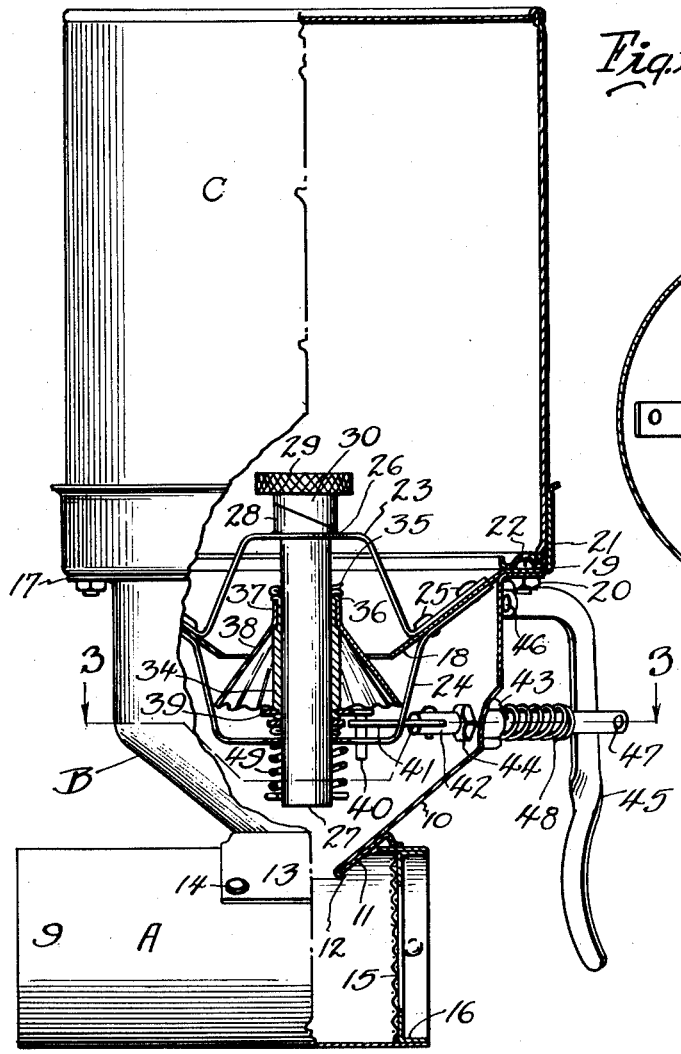
Inventors
Frederick Riebel, Jr.
Dewey M. Dow
By Lynn H. Latta  Attorney Patented June 5, 1934

1,961,168

UNITED STATES PATENT OFFICE 1,961,168

INSECTICIDE DELIVERY APPARATUS

Frederick Riebel, Jr., and Dewey M. Dow, Toledo, Ohio, assignors to Air-Way Electric Appliance Corporation, Toledo, Ohio, a corporation of Delaware Application January 30, 1933, Serial No. 654,216

19 Claims. (Cl. 43—124)

This invention relates to the treatment of moth or other insect infested articles of furniture, and has for its object to provide improvements in devices for attachment to a vacuum cleaner, for feeding solid comminuted insecticide material into the air stream thereof.

A device of this nature includes, generally, a hollow member or mixing chamber for attachment to the cleaner so as to form a part of the system of air conducting passages of said cleaner, a delivery device for feeding the material to said mixing chamber, and a container for the material.

The delivery device includes a delivery chamber having a delivery mouth communicating with the mixing chamber, a hopper forming the top of the delivery chamber and the bottom of the container, and agitating means for feeding the insecticide material measuredly from the hopper to the delivery chamber. Such agitating means is preferably in the form of an oscillatory agitator cone mounted in the hopper mouth, and vertically slidable on the post around which it oscillates, for adjusting its clearance from the hopper mouth.

The container in a device of this character may be formed integrally with the hopper portion of the delivery device, or may be formed as a detachable unit, in which case it may comprise simply the shipping container in which the insecticide material is purchased.

An object of the present invention is to provide an improved structure for achieving detachability of the container.

The invention further contemplates improvements in the mounting of the delivery device on the mixing chamber.

Another object is to provide an improved delivery assembly wherein the oscillatory agitator cone and mechanism for adjusting its spacing relative to the hopper mouth, are carried solely by the hopper.

A further object is to provide improved means for mounting the agitator cone for oscillatory and axial sliding movement, and for connecting it to means for imparting such oscillatory movement.

Another object is to achieve simplicity in the construction of the device. As one means to this end, the invention contemplates a structure in which the means for receiving and holding the insecticide container is formed integrally with the hopper as a peripheral upstanding flange, being connected to the hopper through the medium of a horizontal flange which serves both as a support for the container and as a means for securing the hopper to the mixing chamber.

With these and other objects in view our invention consists in the combination and construction and arrangement of the various parts thereof, whereby the objects contemplated are attained, as more fully set forth in the accompanying specifications, pointed out in our claims, and illustrated in the accompanying drawing, in which:

Fig. 1 is a composite side elevational and sectional view, of an improved delivery apparatus embodying the invention.

Fig. 2 is a plan view of the same with the container removed, the agitator post being shown in section.

Fig. 3 is a horizontal sectional view on the line 3—3 of Fig. 1.

Fig. 4 is a detail view of the adjusting means.

Fig. 5 is a vertical sectional view of the same, and

Fig. 6 is a detail view of the other side of the same.

The main elements of the device already referred to are, in the accompanying drawing, designated as follows: The mixing chamber "A" is surmounted by the delivery device "B" which in turn carries the inverted container "C".

The mixing chamber embodies a tube 9, to form a continuation of a suction passage such as the suction inlet neck of a vacuum cleaner, and in order to telescope with a union for attachment to such suction neck, it is preferably cylindrical.

The delivery device "B" includes the funnel shaped delivery chamber 10 the lower end of which is seated in a saddle 11 and joined thereto by insertion through an opening in the saddle and turned outwardly to form an annular flange 12 engaging the edge of the saddle opening. The saddle in turn is provided with the wings 13, curved downwardly and outwardly to fit the surface of the tube 9 and joined thereto as by rivets 14.

The screen 15 in the intake end of the mixing chamber is joined to the tube 9 by a ring 16, L-shaped in cross section.

At its top the delivery chamber 10 has an out-turned peripheral flange 17. The hopper 18 has an intermediate annular shoulder flange 19 which registers with the flange 18 and is secured thereto by bolts 20, and an up turned peripheral collar flange 21, to receive the container "C".

The container "C" is of a type having an in-turned mouth flange 22 which is channelled. The bolts 20 are arranged so that their heads are accommodated in the channel of the flange 22, whereby the latter may seat snugly against the shoulder flange 19.

The container "C" prior to attachment to the insecticide delivery apparatus serves as a shipping and storage container for the insecticide. The flange 22 of course serves to receive a lid.

Secured to the hopper 18 are upper and lower yoke shaped brackets 23 and 24, each shaped from strip metal, and both secured by the same rivets 25 passing through the hopper. Each has a central ring in which the agitator post 27 is journalled. The upper ring 26 has an integral cam 28, formed by drawing upwardly the metal surrounding its central opening. A knob 29, secured to the upper end of the post 27, has a depending cam skirt 30. The latter has a notch 31 to receive either the high point 32 or the low point 33 of the cam 28.

The agitator sleeve 34 is rotatably mounted on the post 27, and supported between cotter pins 35. Both of its ends have reduced necks 36, the upper one received in the neck 37 of the agitator cone 38, the lower one extended through the crank lever 39, and each turned outwardly to clamp its respective supported member securely against the shoulder formed at its base.

The crank lever 39 carries a depending pin 40 which projects loosely through an opening in the link 41 hinged to the push rod 42. The latter is slidably mounted in a bearing sleeve 43 projected through the wall of the delivery chamber 10 and secured by a threaded nut 44. A handle 45 is pivoted at 46 to the wall 10, extended through the forked outer end of the push rod 42, and secured in said fork by a pin 47. A spring 48, acting between the handle 45 and sleeve 43, serves to oppose inward movement of the handle 45.

Inward movement of the handle causes the agitator cone 38 to be oscillated in one direction, while reverse movement under the action of the spring 48 causes it to move in an opposite direction.

Rotation of the post 27 and knob 29 from the position shown in Fig. 1 to that shown in Figs. 4–6 causes the post to be lifted, shifting the agitator cone from the widely spaced position shown in Fig. 1 to a closely spaced position (with reference to the hopper mouth). As the cone slides vertically, the pin 40 will slide freely relative to the link 41, which is supported by the fork on the end of the push rod 42.

The spring 49 returns the post 27 to its lowered position, and holds the cams 28, 30 in either of their two selective positions.

The post 27 may be tubular for lightness, in which case it is closed by a plug 51 to prevent feeding of the insecticide through it. The two brackets 23, 24 securely position the post 27 and cooperate respectively with means for pulling the post in opposite directions. Being relatively narrow, they do not interfere with flow of the insecticide. They are both secured by the same rivets, facilitating assembly, reducing expense, and mounting the delivery mechanism entirely on the hopper, so that the same may be inserted as an assembled unit into the chamber 10. During such assembly it is only necessary to register the pin 40 with the apertured end of the link 41.

We claim as our invention:

1. A device for disseminating comminuted solid material into a moving air stream, comprising a casing having an orifice in its bottom to communicate with said air stream, an annular partition dividing said casing into an upper chamber constituting a hopper, and a lower chamber constituting a temporary support for loose material delivered from said hopper, and constituting means to confine said loose material and to deliver it to said air stream, and distributor means cooperating with said annular partition to feed the material therethrough.

2. A device for disseminating comminuted solid volatile material comprising a casing having an apertured bottom, an annular partition dividing said casing into upper and lower chambers, a distributor rotatably mounted and coacting with the opening in said partition, and a push rod extended through the wall of the lower chamber and linked eccentrically to said distributor so as to impart oscillation thereto when moved inwardly and outwardly.

3. A device for disseminating comminuted solid volatile material comprising a casing having an apertured bottom, an annular partition dividing said casing into upper and lower chambers, a distributor rotatably mounted and coacting with the opening in said partition, a push rod slidably projected through the wall of the lower chamber, a link pivoted to the inner end of said rod and pivoted eccentrically to the distributor, and a spring urging said rod outwardly.

4. A device for disseminating comminuted solid volatile material comprising a casing having an apertured bottom, an annular partition dividing said casing into upper and lower chambers, a distributor rotatably mounted and coacting with the opening in said partition, a push rod slidably projected through the wall of the lower chamber, a link pivoted to the inner end of said rod and pivoted eccentrically to the distributor, and a lever pivoted to the casing, linked to said push rod, and extending therebeyond to form a finger engaging portion.

5. An insecticide delivery device comprising a delivery chamber formed with an outwardly projecting peripheral flange, a hopper formed with an outwardly projecting annular shoulder flange terminating in an upwardly extending collar flange, said shoulder flange being secured to said peripheral flange and an open mouth insecticide container received in said collar flange in inverted position with its mouth communicating with the hopper and its rim resting on said shoulder flange.

6. An insecticide delivery device comprising a tubular mixing chamber, provided with an opening in a side wall, a saddle including a conical portion extending into said opening and side wings bent backwardly from the periphery thereof toward its smaller end curved outwardly to engage the outer surface of the mixing chamber and secured thereto, and a conical delivery chamber seated in said saddle, the nose portion of said delivery chamber being flanged outwardly in engagement with the edge of the smaller end of the saddle.

7. In an insecticide delivery apparatus, a cylindrical post, a sleeve rotatably mounted thereon and having at its end a reduced neck portion forming a shoulder, and a sheet metal agitator cone having a collar portion receiving said neck portion, the latter being flanged outwardly in engagement with the end of said collar portion, clamping the same against said shoulder.

8. In an insecticide delivery apparatus, a cylindrical post, a sleeve rotatably mounted thereon and having at its end a reduced neck portion forming a shoulder, and a stamped sheet metal lever formed at one end with a ring receiving said neck portion, the latter being flanged outwardly to clamp said ring against said shoulder.

9. An insecticide delivery device comprising a delivery chamber the upper end of which is provided with a hopper and means to receive the mouth end of an insecticide container, vertically spaced brackets carried by said hopper and including central bearings, a post slidably mounted in said bearings, agitating means rotatably mounted on said post, and cooperating devices on the upper end of the post and the upper bracket for adjusting the height of the post.

10. An insecticide delivery device comprising a delivery chamber the upper end of which is provided with a hopper and means to receive the mouth end of an insecticide container, yoke shaped brackets secured to the upper and lower sides of said hopper and including central bearings, a post slidably mounted in said bearings, agitating means rotatably mounted on said post, and cooperating devices on the upper end of the post and the upper bracket for adjusting the height of the post.

11. An insecticide delivery device comprising a delivery chamber the upper end of which is provided with a hopper and means to receive the mouth end of an insecticide container, and agitating means carried solely by said hopper said agitating means comprising a bracket secured to the hopper and including a bearing, a post slidably mounted in said bearing, an agitator member rotatably mounted on the post, and cooperating devices on the upper end of the post and on the bracket for adjusting the height of the post.

12. An insecticide delivery device comprising a delivery chamber the upper end of which is provided with a hopper and means to receive the mouth end of an insecticide container, vertically spaced brackets carried by said hopper and including central bearings, a post slidably mounted in said bearings, agitating means rotatably mounted on said post, and cooperating devices on the upper end of the post and the upper bracket for adjusting the height of the post, the latter of said devices comprising a cam collar punched from the metal of its bracket.

13. An insecticide delivery device comprising a delivery chamber the upper end of which is provided with a hopper and means to receive the mouth end of an insecticide container, yoke shaped brackets secured to the upper and lower sides of said hopper and including central bearings, a post slidably mounted in said bearings, agitating means rotatably mounted on said post, and cooperating devices on the upper end of the post and the upper bracket respectively for adjusting the height of the post, the latter of said devices comprising a cam collar punched from the metal of its bracket.

14. An insecticide delivery device comprising a delivery chamber the upper end of which is provided with a hopper and means to receive the mouth end of an insecticide container, a bracket carried by the hopper and including a bearing, a post slidably mounted in said bearing, agitating means rotatably mounted on said post, cooperating devices on the upper end of the post and the bracket for adjusting the height of the post means carried by the delivery chamber for operating said agitating means, and means linking said agitating and operating means and arranged to allow vertical movement of the one relative to the other.

15. An insecticide delivery device comprising a delivery chamber the upper end of which is provided with a hopper and means to receive the mouth end of an insecticide container, yoke shaped brackets secured to the upper and lower sides of said hopper and including central bearings, a post slidably mounted in said bearings, agitating means rotatably mounted on said post, cooperating devices on the upper end of the post and the upper bracket for adjusting the height of the post, means carried by the delivery chamber for operating said agitating means, and means linking said agitating and operating means and arranged to allow vertical movement of the one relative to the other.

16. An insecticide delivery device comprising a delivery chamber the upper end of which is provided with a hopper and means to receive the mouth end of an insecticide container, a bracket carried by the hopper and including a bearing, a post slidably mounted in said bearing, agitating means rotatably mounted on said post, cooperating devices on the upper end of the post and the bracket for adjusting the height of the post, and means carried by the delivery chamber for operating said agitating means, said operating means including a link supported in a horizontally projecting position and apertured at its end, and said agitating means including a pin projecting through said apertured end in a position parallel to said post.

17. An insecticide delivery device comprising a delivery chamber the upper end of which is provided with a hopper and means to receive the mouth end of an insecticide container, yoke shaped brackets secured to the upper and lower sides of said hopper and including central bearings, a post slidably mounted in said bearings, agitating means rotatably mounted on said post, cooperating devices on the upper end of the post and the upper bracket for adjusting the height of the post, and means carried by the delivery chamber for operating said agitating means, said operating means including a link supported in a horizontally projecting position and apertured at its end, and said agitating means including a pin projecting through said apertured end in a position parallel to said post.

18. An insecticide delivery device comprising a delivery chamber the upper end of which is provided with a hopper and means to receive the mouth end of an insecticide container, agitating means carried solely by said hopper, and actuating means comprising a lever pivoted to the delivery chamber near its upper end and projecting downwardly, a push rod slidably extended through the wall of the delivery chamber and linked at its outer end with said lever, a spring encircling the push rod between the lever and the delivery chamber, and a bearing including headed members threadably secured together through the wall of the delivery chamber, through which said push rod projects.

19. A device for attachment to a tubular member, for disseminating comminuted solid volatile material into an air stream passing therethrough, comprising an open ended sleeve for axial connection to said member, a receptacle mounted upon said sleeve and communicating with a lateral opening therein, and a screen covering the inlet end of said sleeve.

FREDERICK RIEBEL, JR.
DEWEY M. DOW.